United States Patent
Serneels et al.

(10) Patent No.: US 10,035,407 B2
(45) Date of Patent: Jul. 31, 2018

(54) DRIVE MECHANISM FOR A VEHICLE AND METHOD FOR MOVING PANELS FOR A VEHICLE

(71) Applicant: Webasto SE, Stockdorf (DE)

(72) Inventors: Marc Serneels, Les Essarts (FR); Matthieu Brangeon, Le Temple (FR); Dominik Hölzel, Olching (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/420,987

(22) Filed: Jan. 31, 2017

(65) Prior Publication Data

US 2017/0225551 A1 Aug. 10, 2017

(30) Foreign Application Priority Data

Feb. 9, 2016 (EP) .................................... 16154863

(51) Int. Cl.
*B60J 7/043* (2006.01)
*B60J 7/02* (2006.01)
*B60J 7/057* (2006.01)
*B60J 7/047* (2006.01)

(52) U.S. Cl.
CPC ............ *B60J 7/0435* (2013.01); *B60J 7/022* (2013.01); *B60J 7/024* (2013.01); *B60J 7/047* (2013.01); *B60J 7/057* (2013.01); *B60J 7/0573* (2013.01)

(58) Field of Classification Search
CPC . B60J 7/0435; B60J 7/047; B60J 7/053; B60J 7/057; B60J 7/024
USPC .................. 296/216.02–216.05, 220.01, 222
See application file for complete search history.

(56) References Cited

U.S. PATENT DOCUMENTS

| 5,746,475 | A | 5/1998 | Caye et al. | |
|---|---|---|---|---|
| 7,510,237 | B2 | 3/2009 | Tsukamoto et al. | |
| 7,850,231 | B2* | 12/2010 | Ito | B60J 7/024 296/216.03 |
| 8,177,295 | B2* | 5/2012 | Chauvin | B60J 7/053 296/220.01 |

(Continued)

FOREIGN PATENT DOCUMENTS

| DE | 10062156 A1 | 6/2002 |
|---|---|---|
| DE | 102012010148 A1 | 11/2013 |

(Continued)

OTHER PUBLICATIONS

Japanese Examination Report issued against Japanese Application JP2017-016769 dated Feb. 19, 2018.

*Primary Examiner* — Dennis H Pedder
(74) *Attorney, Agent, or Firm* — Fitch, Even, Tabin & Flannery, LLP

(57) ABSTRACT

A drive mechanism for vehicle movable panels having a first slide mechanism having a rod and a sled with a tilt lever, the rod being coupled with the tilt lever for pivoting the tilt lever in a first state and the rod being decoupled from the tilt lever in a second state such that the tilt lever is movable relative to the rod and relative to the guide rail along the first direction, the sled comprising a holding element. In a first position the holding element is locked to the guide rail such that the sled is latched relative to the guide rail and in a second position the sled is movable relative to the guide rail to transmit a movement of the sled along the first direction to a second slide mechanism and the holding element holds the tilt lever, when the rod is decoupled from the tilt lever.

15 Claims, 14 Drawing Sheets

(56) References Cited

U.S. PATENT DOCUMENTS

| | | | | |
|---|---|---|---|---|
| 8,720,987 | B2* | 5/2014 | Ohdoi | B60J 7/024 296/216.03 |
| 8,727,432 | B2* | 5/2014 | Yoshida | B60J 7/024 296/216.03 |
| 8,740,296 | B2* | 6/2014 | Ohdoi | B60J 7/024 296/216.03 |
| 9,114,689 | B2 | 8/2015 | Dietl | |
| 2010/0327632 | A1 | 12/2010 | Horiuchi et al. | |
| 2013/0193720 | A1 | 8/2013 | Yoshida | |

FOREIGN PATENT DOCUMENTS

| | | |
|---|---|---|
| JP | H04103431 A | 4/1992 |
| JP | H04243623 A | 8/1992 |
| JP | 2008062912 A | 3/2008 |
| JP | 2012121358 A | 6/2012 |
| JP | 2013226963 A | 11/2013 |
| JP | 2014046836 A | 3/2014 |

* cited by examiner

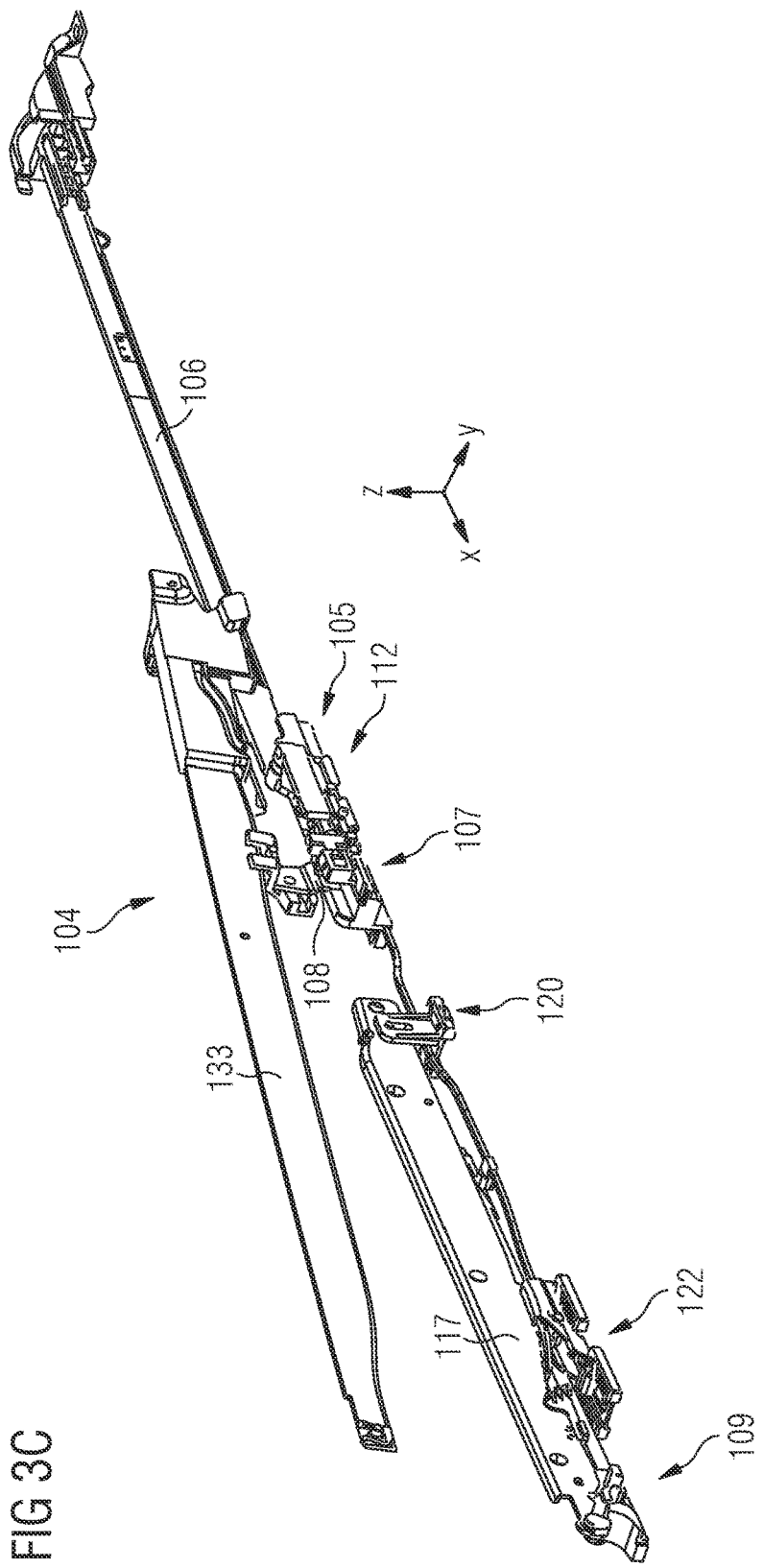

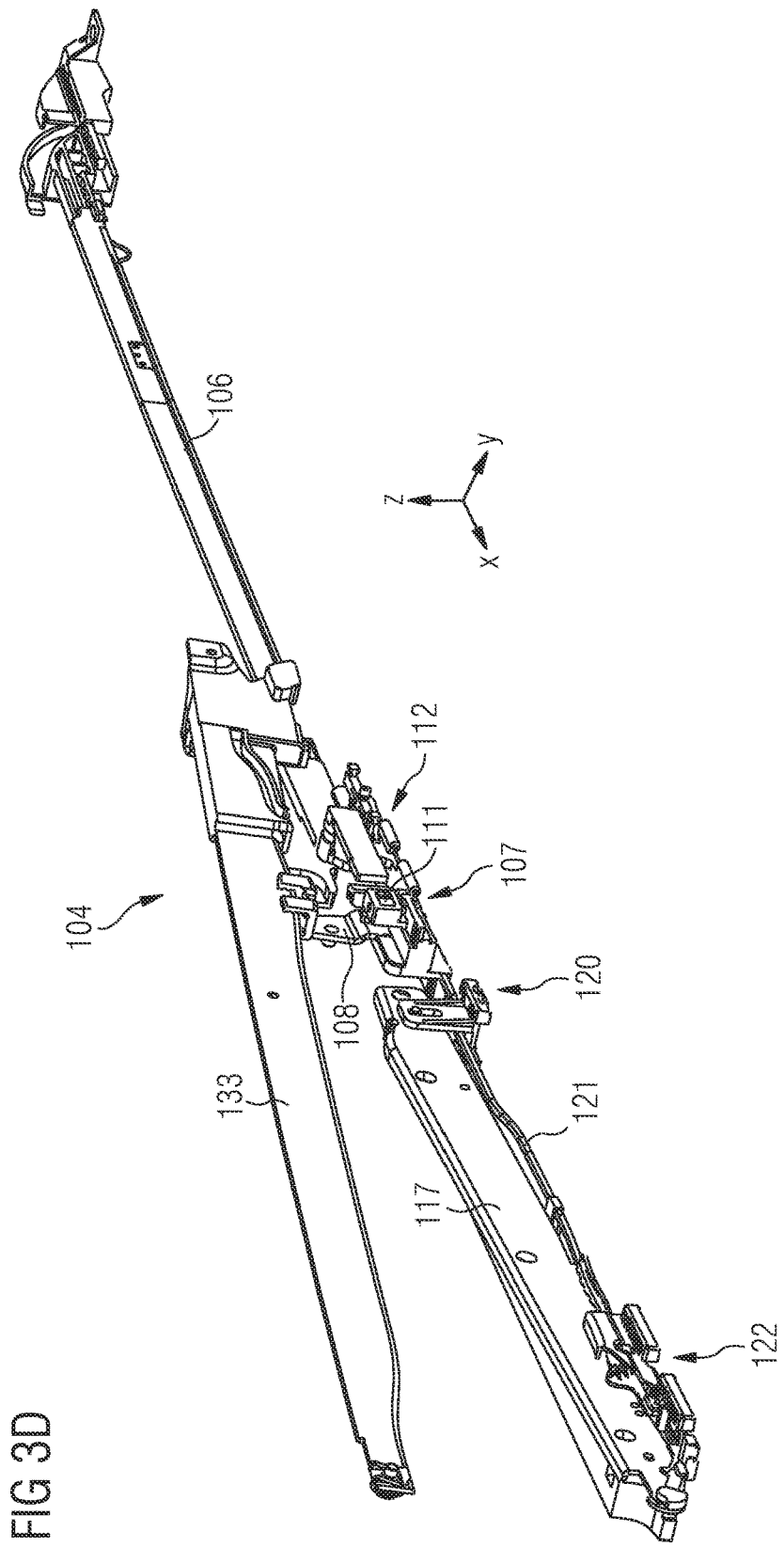

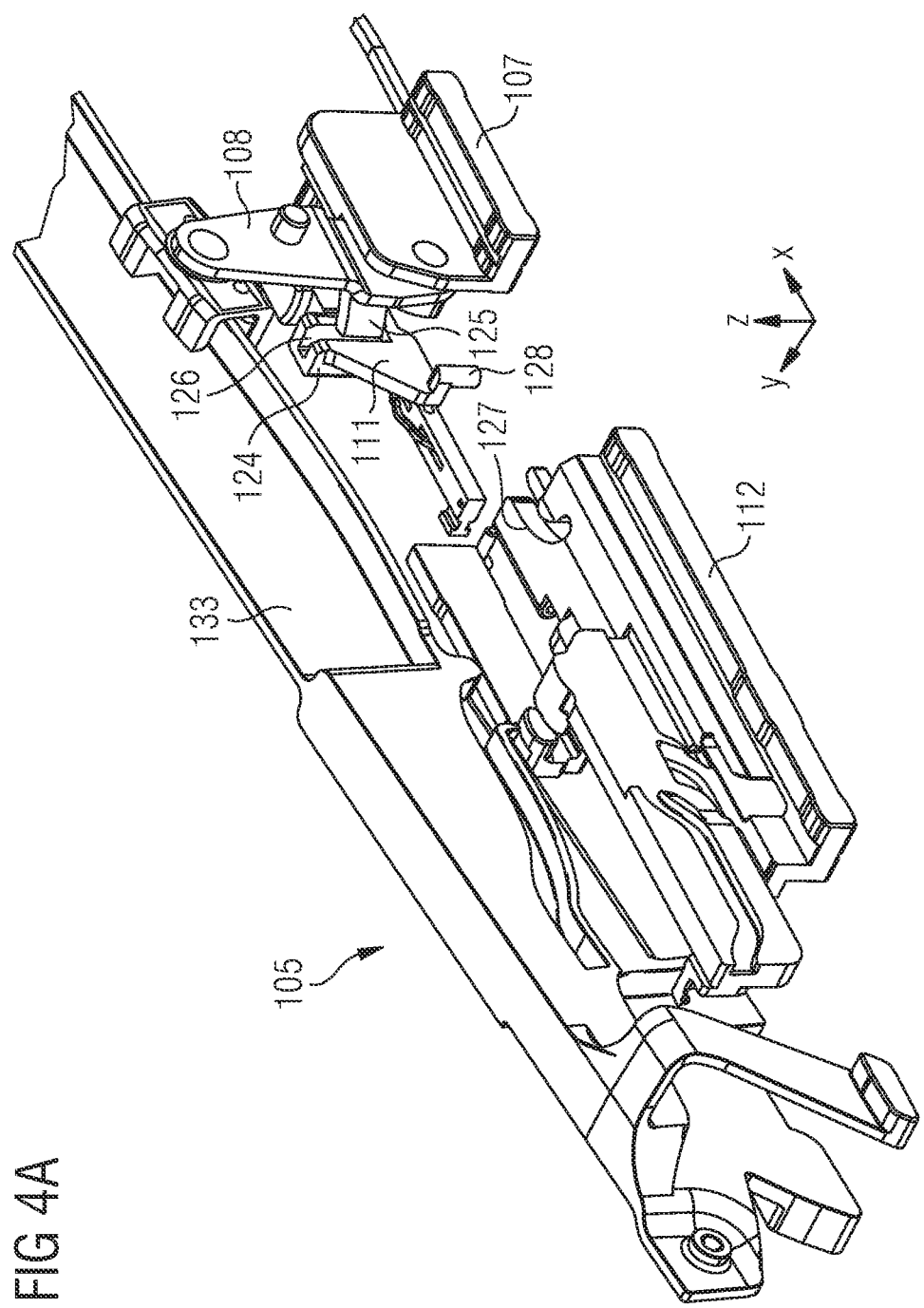

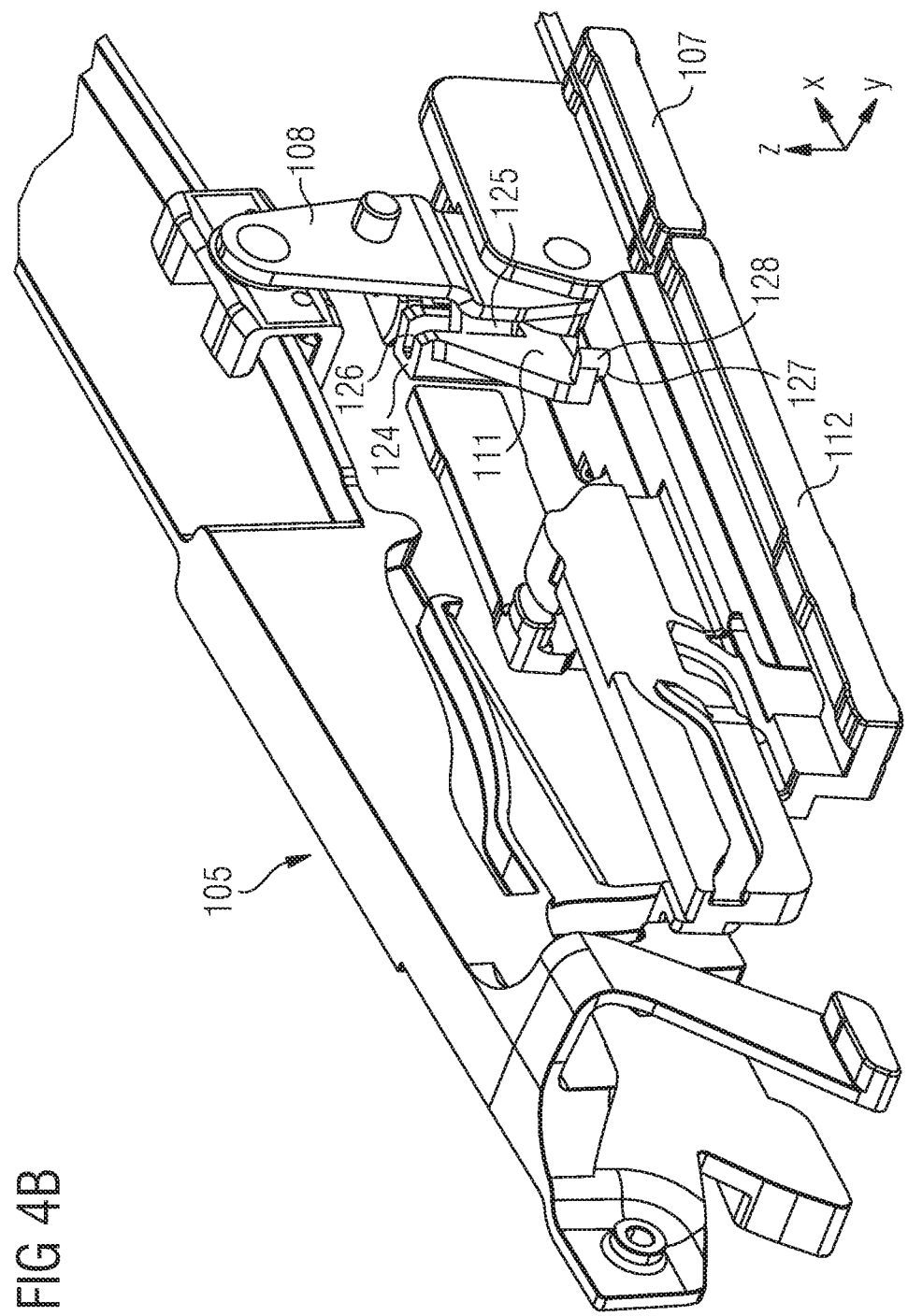

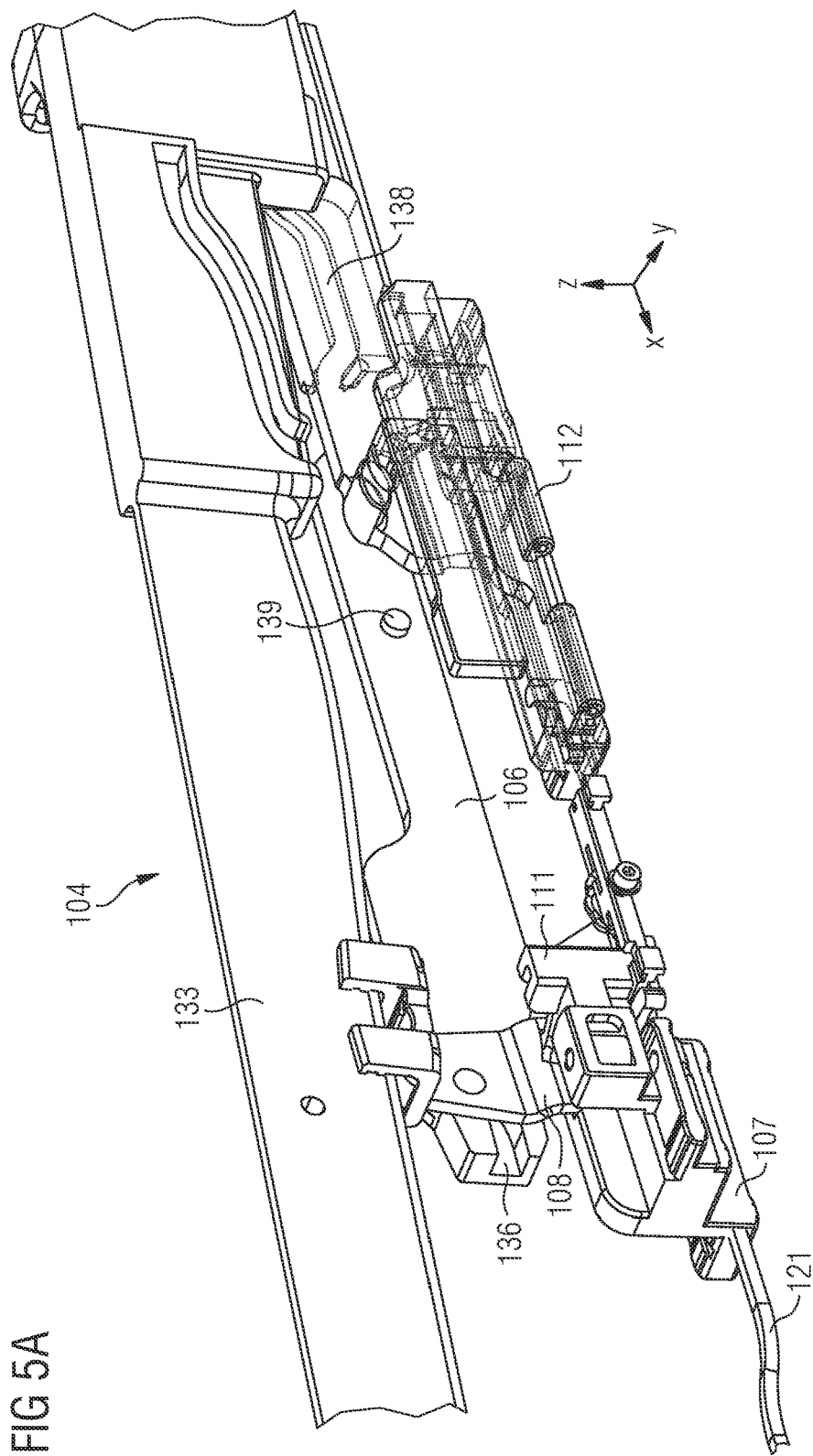

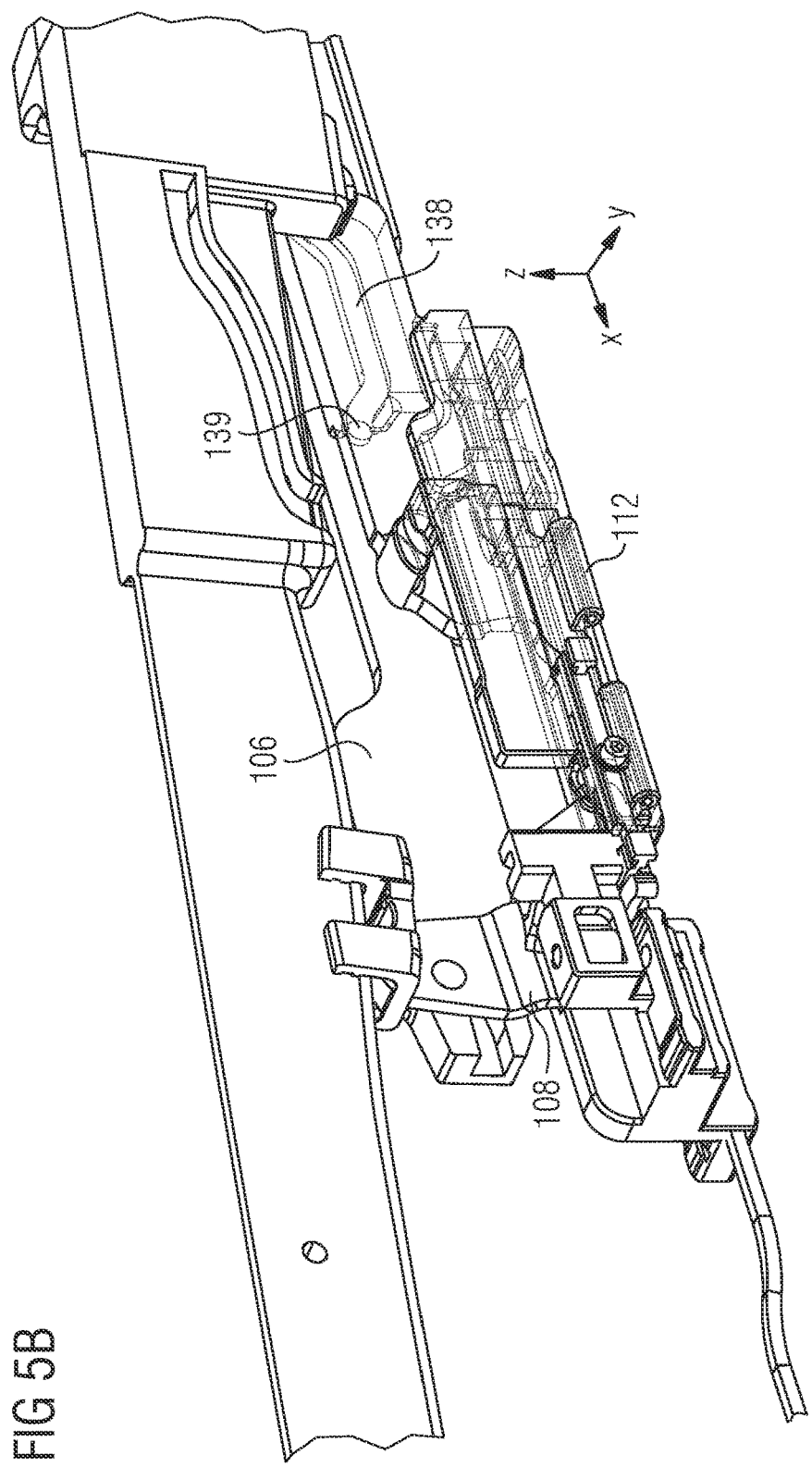

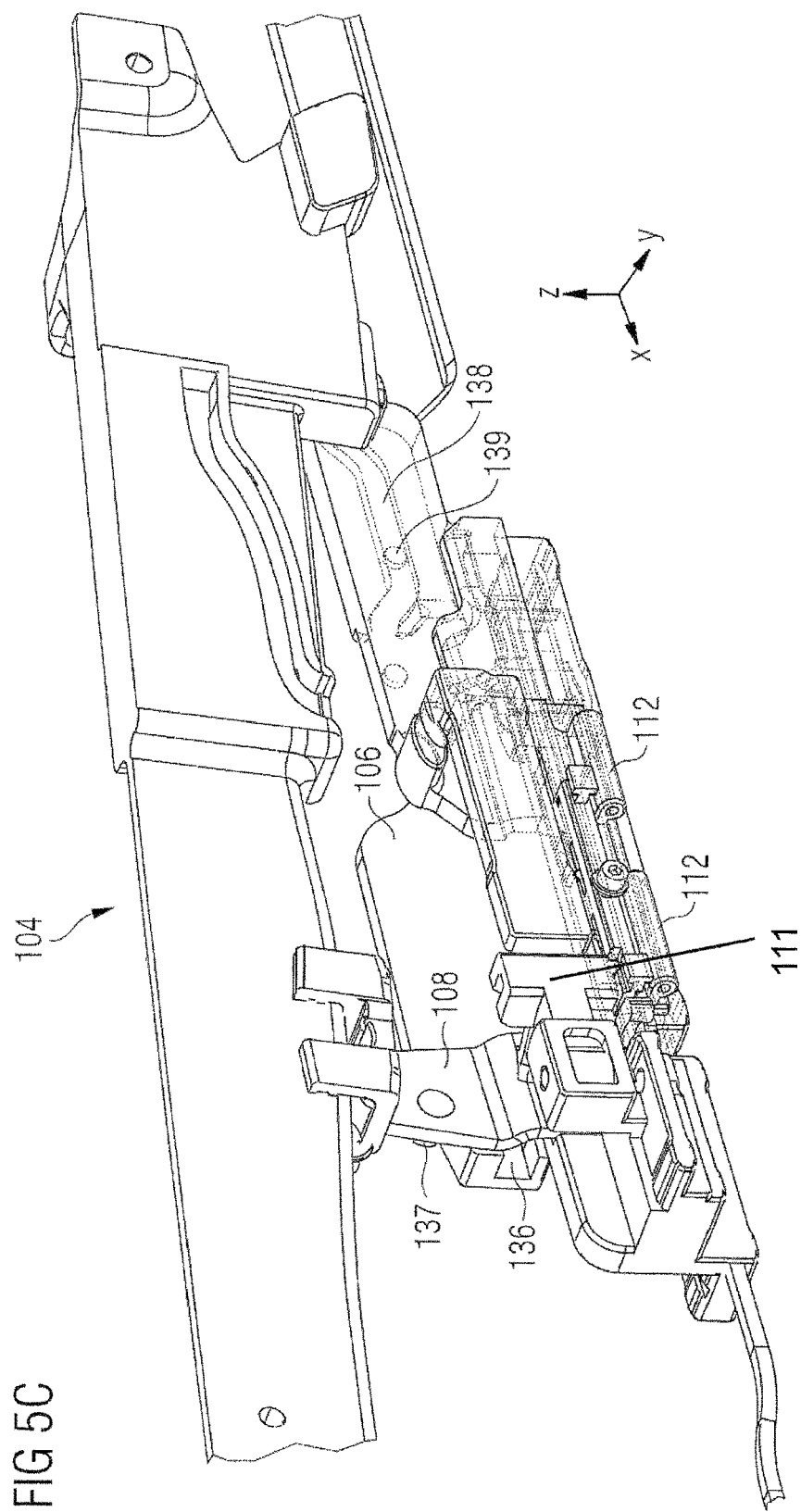

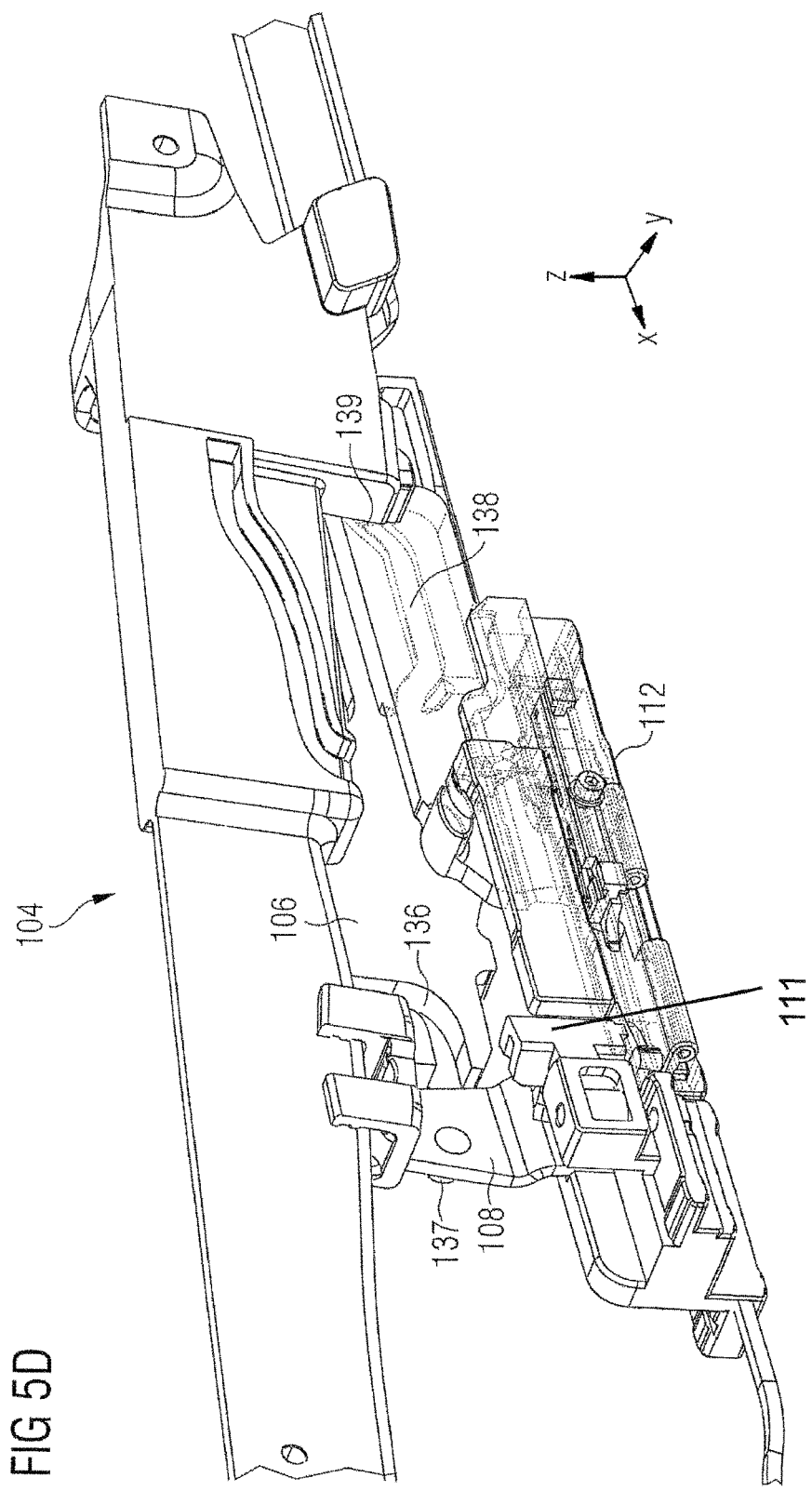

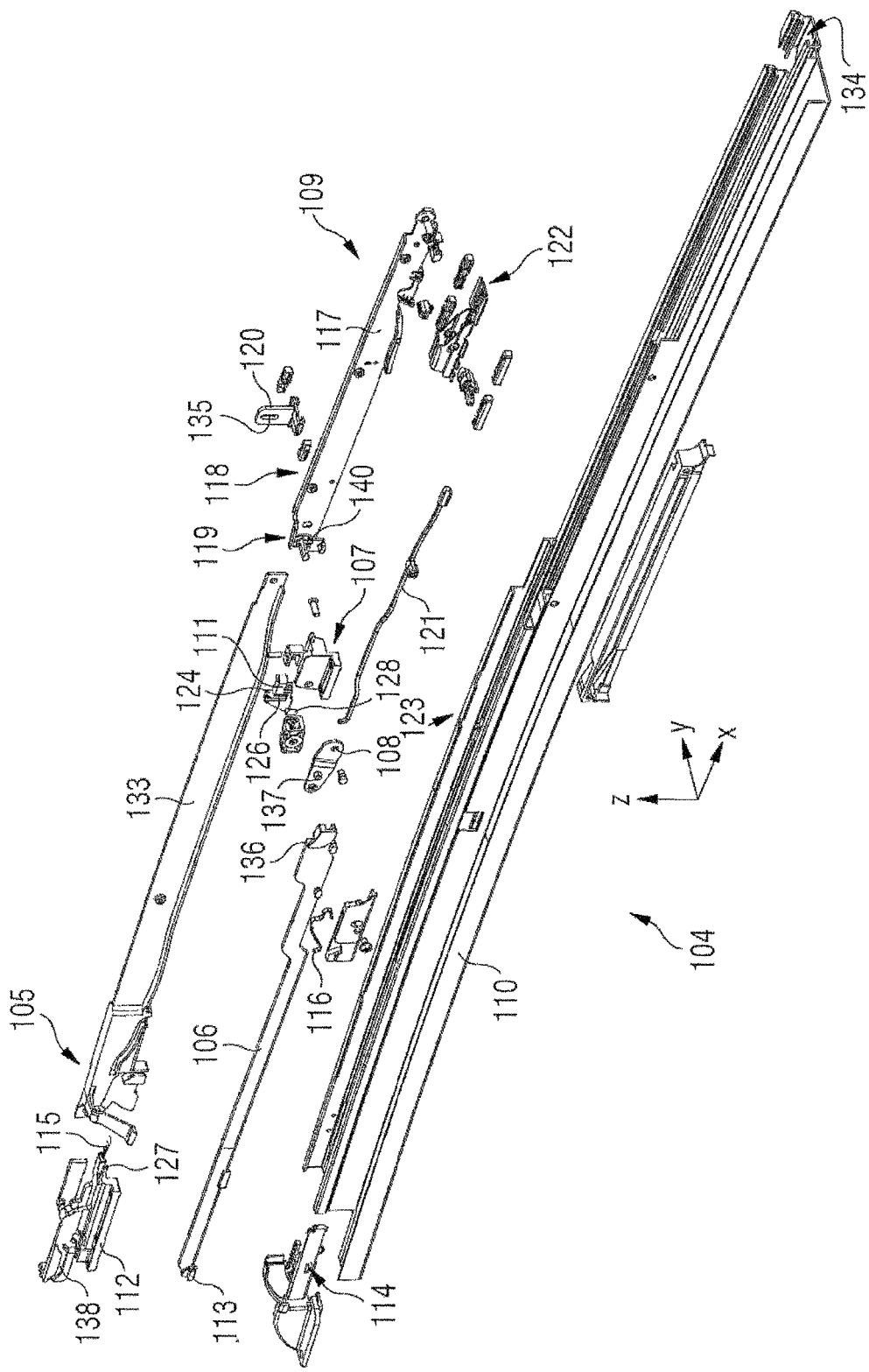

DRIVE MECHANISM FOR A VEHICLE AND METHOD FOR MOVING PANELS FOR A VEHICLE

CROSS-REFERENCE TO RELATED APPLICATIONS

This application claims priority from European Application No. 16154863.1, filed Feb. 9, 2016, which is hereby incorporated herein by reference in its entirety for all purposes.

FIELD OF TECHNOLOGY

The invention relates to a drive mechanism for a first and a second movable panel for a vehicle. Further, the invention relates to a method for moving a first and a second movable panel for a vehicle.

BACKGROUND

Vehicles can be equipped with a roof opening in the roof of the vehicle, which is closed by one or more panels. A sliding roof device with two panels is known from DE 102012010148 A1. The rear panel of the described device is tiltable.

It is desirable to specify a drive mechanism for a first and a second movable panel that allows a wide opening of the roof opening.

SUMMARY OF THE INVENTION

According to at least one embodiment of the invention a drive mechanism for a first and a second movable panel for a vehicle comprises a first slide mechanism. The first slide mechanism is movable along a first direction within a guide rail for moving the first movable panel. The drive mechanism comprises a second slide mechanism. The second slide mechanism is movable along the first direction within the guide rail for moving the second movable panel. The first slide mechanism comprises a rod and a sled with a tilt lever. The rod is coupled with the tilt lever for pivoting the tilt lever in a first state. The rod is decoupled from the tilt lever in a second state such that the tilt lever is movable relative to the rod and relative to the guide rail along the first direction. The sled comprises a holding element. The holding element is movable between a first position and a second position. In the first position the holding element is locked to the guide rail such that the sled is latched relative to the guide rail. In a second position the sled is movable relative to the guide rail to transmit a movement of the sled along the first direction to the second slide mechanism. The holding element holds the tilt lever when a rod is decoupled from the tilt lever.

The drive mechanism comprises two movable panels. The first panel, which is also known as the front panel, is of a spoiler type. The rear panel is movable beneath the roof of the vehicle such as an inner sliding panel. For opening the roof opening, which is closable by the two panels, the first panel is tilted and moved in direction of the second panel. The second panel is moved beneath the roof of the vehicle towards the back window of the vehicle. Due to this displacement of the second panel, the first panel is further movable towards the rear window of the vehicle as well.

For tilting the rear edge of the first panel the tilt lever is pivoted. The tilt lever is driven by a movement of the rod. During the pivoting the sled is connected to the guide rail by the holding element such that the sled and the tilt lever don't move along the first direction relative to the guide rail.

For displacing the second panel and the first panel towards the rear window, the coupling between the rod and the tilt lever is decoupled. Hence the tilt lever is movable along the first direction relative to the rod and the guide rail. For holding the tilt lever when it is uncoupled from the rod, the sled comprises the holding element. The holding element is connected with the tilt lever in the second position for holding the tilt lever in its pivoted upwards position. Thus, the tilt lever is stable during the movement of the first panel together with the second panel towards the rear window. Hence, a wide opening of the roof opening is possible.

According to at least one embodiment, a method for moving a first and a second movable panel for a vehicle comprises:
  moving a rod of a first slide mechanism along a first direction relative to a guide rail and thereby
  pivoting a tilt lever for tilting a rear edge of the first panel, the tilt lever being coupled with the rod,
  moving the first panel relative to the tilt lever along the first direction,
  decoupling the rod from the tilt lever,
  moving the tilt lever relative to the rod along the first direction, and thereby
  moving a second slide mechanism for moving the first second panel.

With the described method it is possible to tilt the first movable panel by the tilt lever driven by a movement of the rod. During a first opening phase the first panel is moved relative to the tilt lever along the first direction. During a second opening phase the rod is decoupled from the tilt lever. The first movable panel is moved together with the tilt lever relative to the rod along the first direction. This drives the movement of the second movable panel along the first direction. Due to the displacement of the second movable panel a first movable panel is movable closer to the rear window of the vehicle and thus a wider opening of the roof opening is possible.

The described mechanism and method enable a secure and stable movement of both panels for a wide opening of the roof opening.

BRIEF DESCRIPTION OF THE DRAWINGS

Various embodiments of the present invention will be described with reference to the attached drawings. In the drawings like reference symbols are used for like elements.

FIGS. 3A to 3E schematically show the drive mechanism in different positions.

FIGS. 4A and 4B schematically show a detail of the drive mechanism in different positions.

FIG. 5A to 5D schematically show a detail of the drive mechanism in various positions.

FIG. 6 schematically shows an exploded view of a drive mechanism in accordance with an embodiment of the invention.

DETAILED DESCRIPTION OF THE DRAWINGS

Figure 1:
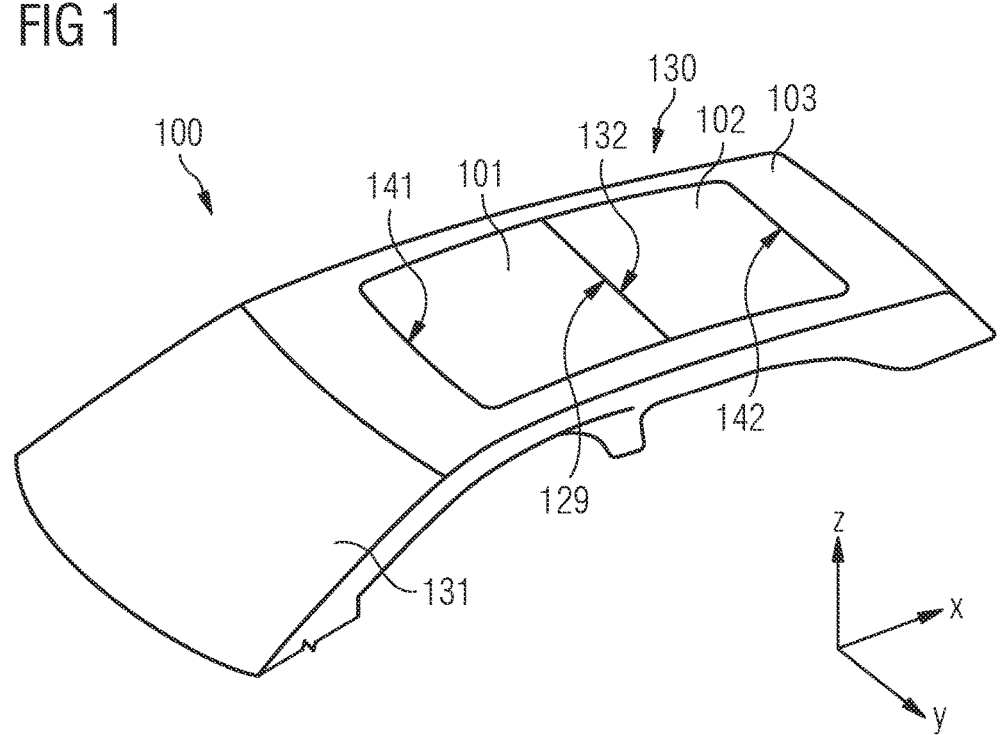
FIG. 1 schematically shows a roof of a vehicle in accordance with an embodiment of the invention.

FIG. 1 shows a roof 103 of a vehicle 100. The roof 103 comprises the roof opening 130. The roof opening 130 can be closed by a first movable panel 101 and a second movable panel 102.

The first movable panel 101 is also called the front panel. The first movable panel 101 is arranged closer to a windshield 131 of the vehicle 100 than the second movable panel 102 in a closed position of the panels 101 and 102 as shown in FIG. 1.

The second panel 102 is also called the rear panel and is arranged behind the first panel 101 in a first direction X. The first panel 101 is arranged between the windshield 131 and the second panel 102 in the first direction X in the closed position.

The panels 101 and 102 are part of a sunroof. In particular, the first panel 101 is of a spoiler type. The second panel 102 is displaceable beneath the roof 103 like an inner sliding roof type. It is possible to tilt the first panel 101. Further, it is possible to move the first panel 101 above the second panel 102 and in the first direction X to free the roof opening 130 in a front part.

Figure 2:
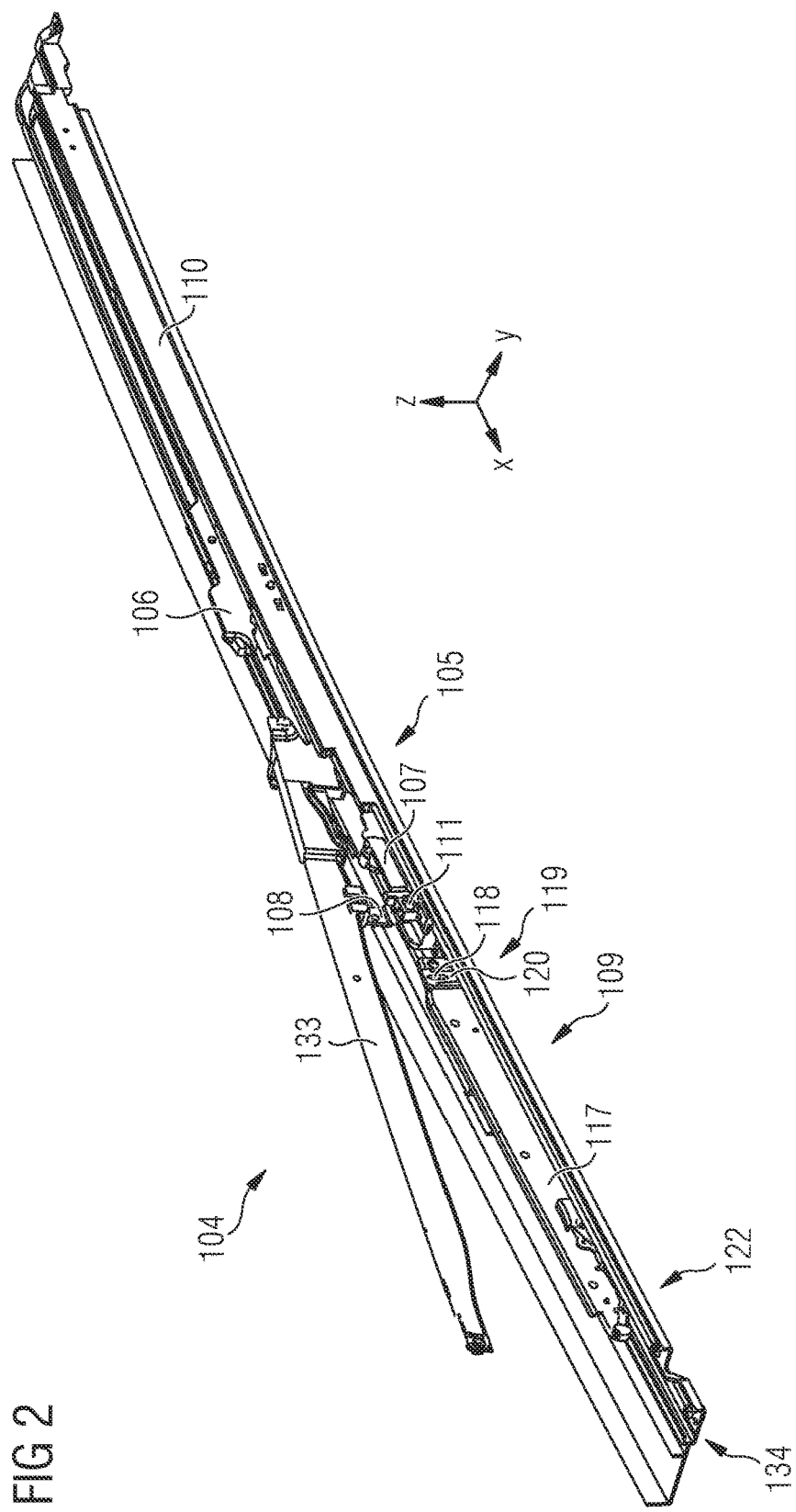
FIG. 2 schematically shows a drive mechanism in accordance with an embodiment of the invention.

FIG. 2 shows a drive mechanism 104 for moving the first panel 101 and the second panel 102. The figures only show one drive mechanism 104. In the vehicle 103, such a drive mechanism 104 is arranged at both lateral sides of the roof opening 130. As both drive mechanisms 104 are formed correspondingly, only the one drive mechanism 104 will be explained with reference to the drawings.

FIG. 2 shows a guide rail 110. A first slide mechanism 105 is movable along the first direction X for moving the first panel 101 relative to the guide rail 110. A second slide mechanism 109 is movable along the first direction X for moving the second panel 102 relative to the guide rail 110. The first slide mechanism 105 comprises a panel carrier 133 which is connected to the first panel 101. The second slide mechanism 109 comprises a panel carrier 117 which is connected to the second panel 102.

As shown in more detail by the FIGS. 3A to 3D, the first panel 101 is tilted at first starting in the closed state. A rear edge 129 (FIG. 1) of the first panel 101 is moved in a third direction Z for tilting the first panel. The third direction Z is substantially perpendicular to the first direction X. In a normal orientation of the vehicle 100 the third direction Z is vertical. The first direction X is horizontal. A second direction Y is substantially perpendicular to the first direction X and the third direction Z.

Figure 3A:
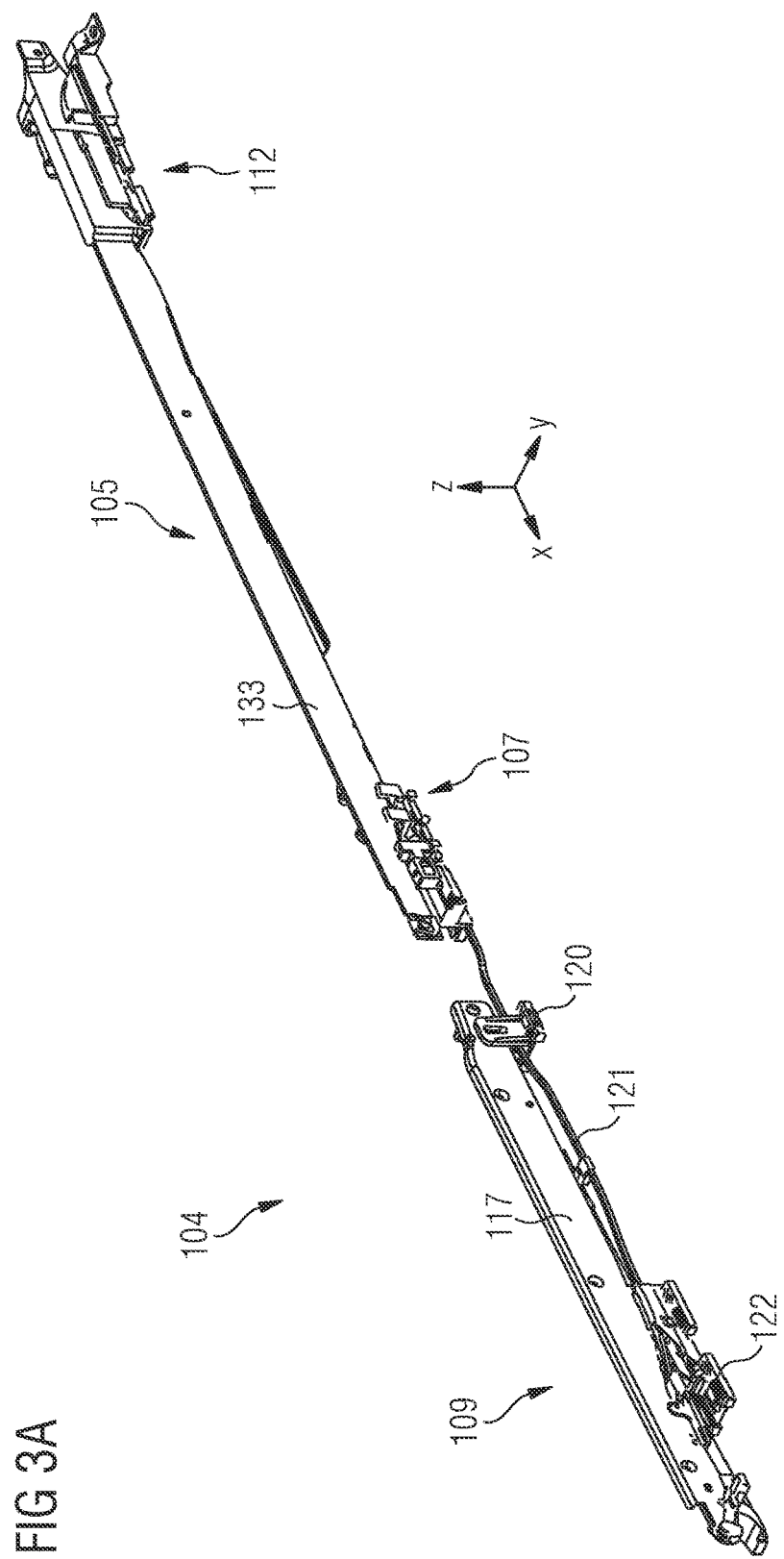

FIG. 3A shows the drive mechanism 104 in a closed state of the first and the second panel 101 and 102. A tilt lever 108 (FIG. 3B) is in its first position. The tilt lever 108 is coupled with a sled 107 of the first slide mechanism 105. The sled 107 is closer to the rear edge 129 of the first panel 101 than a second sled 112 of the first slide mechanism 105.

The second sled 112 is arranged at a front edge 141 of the first panel 101.

The second slide mechanism 109 comprises a slider 120. The slider 120 is arranged at a front edge 132 (FIG. 1) of the second panel 102. The second slide mechanism 109 further comprises a sled 122 which is arranged at a rear edge 142 of the second panel 102.

The sled 107 and the second sled 112 of the first slide mechanism 105 as well as the slider 120 and the sled 122 of the second slide mechanism 109 each are guided in one or more guide channels 134 (FIG. 2) of the guide rail 110.

A link rod 121 is arranged between the sled 107 of the first sled mechanism 105 and the sled 122 of the second slide mechanism 109. The link rod 121 is fixedly connected to the sleds 107 and 122 to transmit a movement of the sled 107 along the first direction X to the sled 122 of the second slide mechanism 109.

Figure 3B:
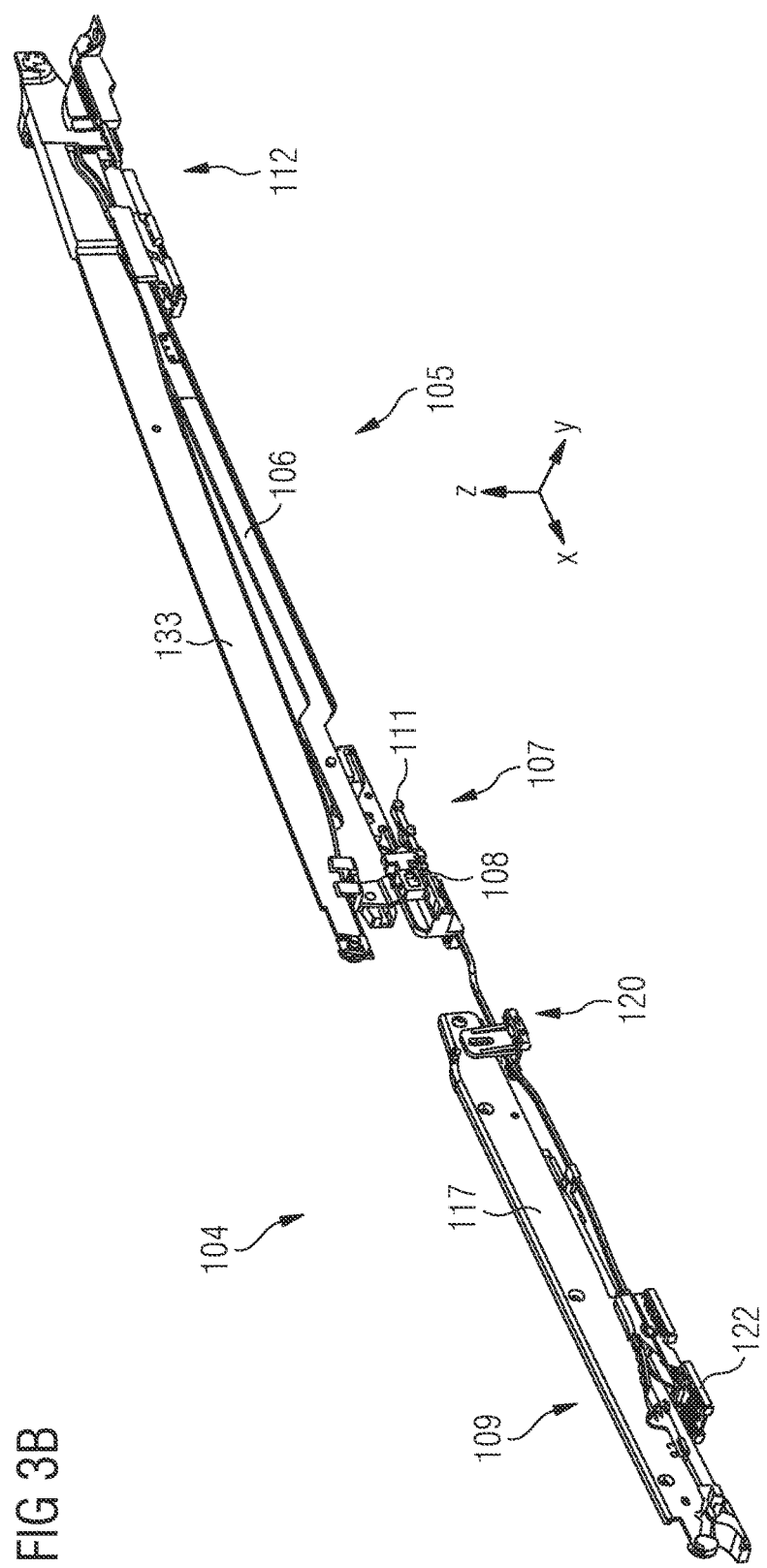

FIG. 3B shows the drive mechanism 104 in a position in which the first panel 101 is titled. The second sled 112 of the first slide mechanism 105 is moved in the first direction X. The other sleds 107 and 122 as well as the slider 120 remain in the same position as in the closed state. Due to the movement of the second sled 112 a rod 106 is moved as well. The rod 106 is coupled with the second sled 112 during a third state of the rod 106. When the rod 106 is coupled to the second sled 112, the movement of the sled 112 along the first direction X is transmitted to the rod 106. An opposite end of the rod 106 is coupled with the tilt lever 108 in a first state of the rod 106. The first state and the third state may exist simultaneously. During the first state the movement of the rod 106 in the first direction X pivots the tilt lever 108 to the shown pivoted position. Due to the rotational movement of the tilt lever 108 the rear edge 129 of the first panel 101 is raised.

The sled 107 of the first slide mechanism 105 is latched to the guide rail 110 by a holding element 111 in a first position of the holding element 111. The holding element 111 is pivotally coupled with the sled 107 around the Z axis. In the first position the holding element 111 engages the guide rail 110 to hold the sled 107 immovable along the first direction X relative to the guide rail 110. Therefore the holding element 111 comprises a projecting part 124 (FIGS. 4A and 4B). The guide rail 110 comprises a recess 123 (FIG. 6). The projecting part 124 of the holding element 111 is arranged in the recess 123 of the guide rail 110 for holding the holding element 111 fixedly to the guide rail 110 and hence holding the sled 107 immovable along the first direction X relative to the guide rail 110.

FIG. 3C shows the drive mechanism 104 in a state in which the first panel 101 is open. The second sled 112 is moved further in the first direction X relative to the guide rail 110 and the sled 107 of the first slide mechanism 105. The panel carrier 133 is moved relative to the tilt lever 108 in the first direction X. The rod 106 is connected to the tilt lever 108 to hold the tilt lever 108 in its pivoted position.

The front side end of the rod 106 is decoupled from the second sled 112. Hence a movement of the second sled 112 relative to the rod 106 is possible. In a fourth state of the rod 106, the rod 106 is locked to the guide rail 110 for holding the tilt lever 108. The rod 106 comprises a projecting part 113 (FIG. 6). The guide rail 110 comprises an opening 114. For fixing the rod 106 relative to the guide rail 110 in the first direction X the projecting part 113 of the rod 106 is arranged in the opening 114 of the guide rail 110. The rod is at least partly movable at the front side end along the second direction Y for moving the projecting part 113 of the rod 106 in and out of the opening 114 of the guide rail 110.

FIG. 3D shows the drive mechanism 104 in a position at the beginning of the opening phase of the second panel 102. The rod 106 is in a second state in which the rod 106 is decoupled from the tilt lever 108. Accordingly, the tilt lever 108 is free to move in the first direction X relative to the rod 106. The second sled 112 pushes the sled 107 in the first direction X. The link rod 121 transmits the movement of the sled 107 of the first slide mechanism 105 to the sled 122 of the second slide mechanism 109. The sled 122 of the second slide mechanism 109 moves in the first direction X and moves a rear edge of the second panel 102 in the negative third direction Z.

The coupling of the rod 106 with the tilt lever 108 and the decoupling is explained in more detail with reference to FIGS. 5A to 5D.

For holding the tilt lever 108 in its pivoted position when it is decoupled from the rod 106, the holding element 111 is tilted in its second position. In the second position of the holding element 111, the holding element 111, in particular the projecting part 124, is moved out of the recess 123 of the guide rail 110. The holding element 111 on the one hand holds the sled 107 latched to the guide rail 110 in its first position. In the first position the tilt lever 108 is pivotable with respect to the holding element 111. On the other hand, in the second position of the holding element 111, the holding element 111 fixes the tilt lever 108 in its upright pivoted position. The holding element 111 allows a movement of the sled 107 along the first direction X relative to the guide rail 110 in the second position. The holding elements 111 is movable along the first direction X relative to the guide rail 110 in the second position. The coupling and decoupling of the holding element 111 with the tilt lever 108 is explained in more detail with respect to FIGS. 4A and 4B.

Figure 3E:
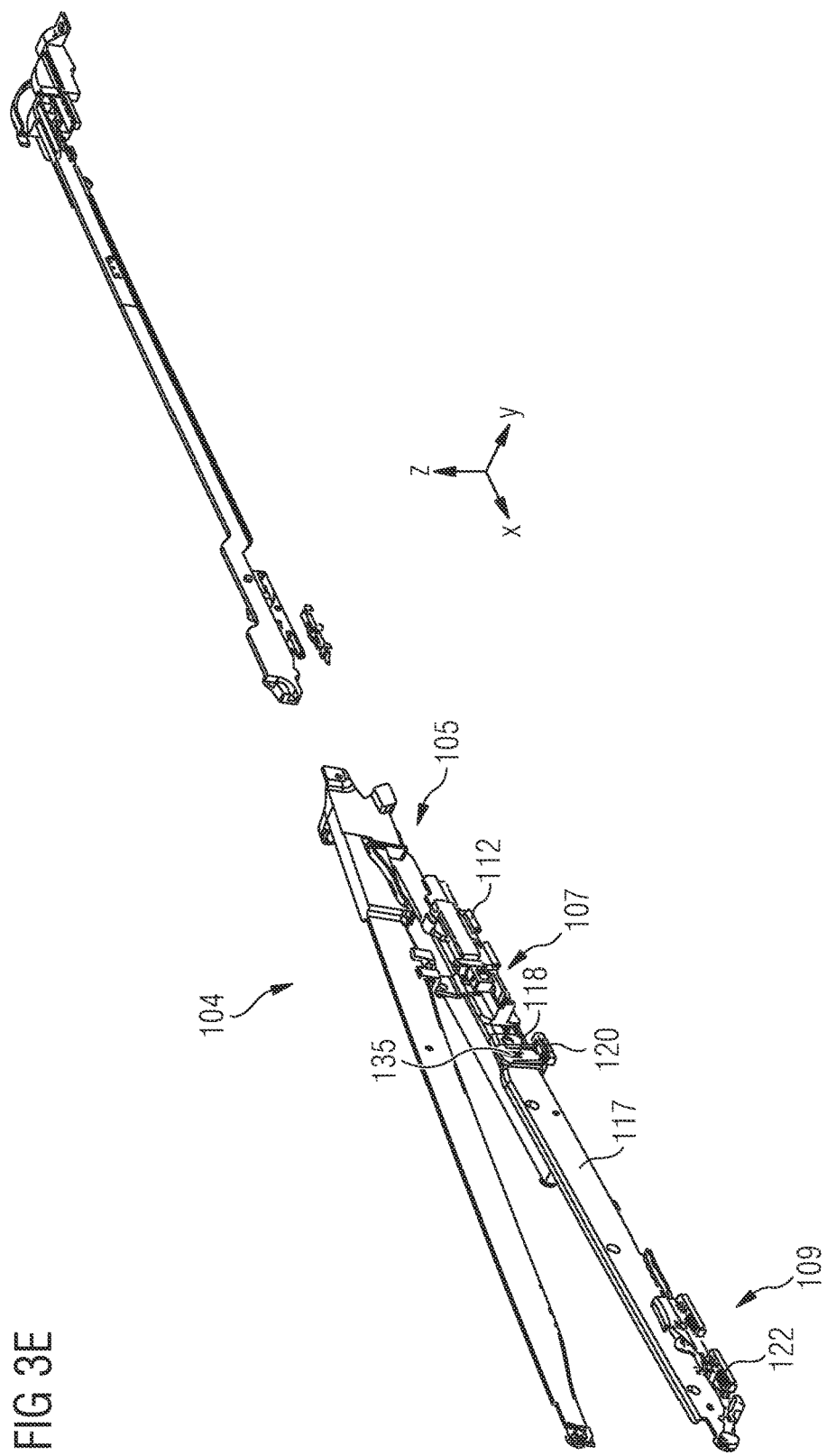

FIG. 3E shows the drive mechanism 104 in a state in which both panels are open. Both panels are moved in the first direction X to open the roof opening 130. The second sled 112 therefore pushes the sled 107 of the first slide mechanism 105 in the first direction X. The sled 107 of the first slide mechanism 105 gets in contact with the slider 120 of the second slide mechanism 109. The slider 120 is moved in the first direction X as well.

The slider 120 comprises a notch 135 which extends along the third direction Z. A pin 118 of the panel carrier 117 is arranged in the notch 135 of the slider 120. The panel carrier 117 for the second panel 102 comprises the pin 118 at an end 119 (FIG. 6), which is facing the first slide mechanism 105. The panel carrier 117 of the second panel 102 is movable along the third direction Z at a front edge 132 of the second panel 102. The connection of the panel carrier 117 of the second panel 102 with the slider 120 allows movement of the front edge 132 of the second panel 102 along the third direction Z and transmits a movement along the first direction X of the slider 120 to the panel carrier 117 of the second panel 102. It is possible to completely lower the second panel 102 beneath the roof 103 and displace the panel 102 beneath the roof 103. Accordingly, the first panel 101 is movable in the first direction X to widely open the roof opening 130.

FIG. 4A shows the holding element 111 in the first position. The holding element 111 is arranged in the recess 123 (FIG. 6) of the guide rail 110 with the projecting part 124. In particular, the holding element 111 and the tilt lever 108 are in no functional contact to each other. The holding element 111 holds the sled 107 of the first slide mechanism 105 immovable along the first direction X relative to the guide rail 110. The second sled 112 is movable along the first direction X for tilting the first panel 101 and for displacing the first panel 101 in the first direction X.

The holding element 111 comprises a pin 128. The second sled 112 comprises a slotted guide 127. In the first position of the holding element 111 the pin 128 is not arranged inside the slotted guide 127.

FIG. 4B shows the holding element 111 in its second position. The second sled 112 is moved further in the first direction X. The pin 128 of the holding element 111 enters the slotted guide 127 of the second sled 112. During the movement of the second sled 112 in the first direction X relative to the holding element 111, the coupling between the pin 128 of the holding element 111 and the slotted guide 127 rotates the holding element 111 around the Z axis. The projecting part 124 of the holding element 111 leaves the recess 123 of the guide rail 110. A movement of the sled 107 of the first slide mechanism 105 along the first direction X relative to the guide rail 110 is possible.

The tilt lever 108 comprises a slide block 125 that projects along the second direction Y. The holding element 111 comprises a notch 126. In the second position of the holding element 111, the slide block 125 is arranged in the notch 126 of the holding element 111. In the first position of the holding element 111 (FIG. 4A) the slide block 125 is arranged outside the notch 126 of the holding element 111. In the second position (FIG. 4B) the holding element 111 holds the tilt lever 108 in its shown pivoted position due to the coupling of the slide block 125 and the notch 126. Due to the coupling of the holding element 111 and the slide block 125 of the tilt lever 108, the tilt lever 108 is stable during the common movement of the first panel 101 and the second panel 102.

The second sled 112 comprises an engagement element, which engages behind the holding element 111 in the second position of the holding element 111. The engagement element of the second sled 112 contributes to maintain the holding element 111 in its second position.

FIG. 5A shows the drive mechanism 104 in the first state of the rod 106 in which the rod 106 is coupled to the tilt lever 108 for rotating the tilt lever 108. A pin 137 (FIG. 6) of the tilt lever 108 is arranged in a guide channel 136 of the rod 106. A further pin 139 of the rod 106 is arranged outside a related further slotted guide 138 of the second sled 112.

When the second sled 112 is moved in the first direction X, as shown in FIG. 5B, the further slotted guide 138 reaches the pin 139. The further slotted guide 138 comprises a shape, such that it can move the rod 106 along the third direction Y for decoupling the rod 106 from the tilt lever 108.

FIG. 5C shows the rod 106 displaced in the negative third direction Z. The further pin 139 is pushed downwards by the further slotted guide 138 when the second sled 112 moves further in the first direction X. When the rod 106 is moved in the negative direction Z the pin 137 of the tilt lever 108 leaves the guide channel 136 of the rod 106. Hence the tilt lever 108 and the rod 106 are decoupled and free to move relative to each other. The rod 106 is in its second state.

FIG. 5D shows the drive mechanism 104 in a state in which the tilt lever 108 is moved in the first direction relative to the rod 106. The further pin 139 and the further slotted guide 138 can decouple. The rod 106 is moved in the third direction Z to its initial position. The movement of the rod 106 from the pushed down position as shown in FIG. 5C to the initial position as shown in FIGS. 5A and 5D is supported by a spring 116 (FIG. 6). The spring 116 exerts a force on the rod 106 in the third direction Z.

FIG. 6 shows an exploded view of the drive mechanism 104. With the drive mechanism 104 a kinematic sequence with four positions is possible. In the first position both panels 101 and 102 are closed. In a second position the first panel 101 is tilted and the second panel 102 is closed. In a third position the first panel 101 is opened and the second panel 102 is closed. In a fourth position the first panel 101 is opened and the second panel 102 is opened as well. The first slide mechanism 105 may generate a movement as a conventional drive mechanism during the opening phase of the first panel 101. In contrast to conventional drive mechanisms of the spoiler type, the sled 107 of the first slide mechanism 105 with a tilt lever 108 is able to move along the first direction X relative to the guide rail 110 in order to open the first panel 101 at the same time as the movement of the second panel 102. Therefore, the latching system with the movable rod 106 with the guide channel 136 and the pin 137 of the tilt lever 108 is implemented. The holding element 111 with the projecting part 124 and the notch 126 is implemented for holding the sled 107 of the first slide mechanism 105 during the opening phase of the first panel 101 when the second panel 102 remains unmoved. The holding element 111 is implemented for holding the tilt lever 108 when the tilt lever 108 is decoupled from the rod 106 when the first panel 101 and the second panel 101 move at the same time.

The second slide mechanism 109 comprises the slider 120 with the notch 134 that allows a movement of the front edge 132 of the second panel 102 along the third direction Z. That, for example, allows a gap of 8 mm to 12 mm between the rear roof 103 and the second panel 102 when the second panel 102 is completely opened. Therefore the pin 118 is formed at the panel carrier 117 for the second panel 102. A slide pin 140 of the panel carrier 117 for the second panel 102 is guided in the guide rail and then in a slotted guide to move the front edge 132 of the second panel 102 along the third direction Z.

The link between the first slide mechanism 105 and the second slide mechanism 109 is realized by the link rod 121. Hence it is possible to move both panels 101 and 102 with only one electric motor. The electric motor is coupled with a drive cable 115. The drive cable is only connected directly to the second sled 112. The movement of the second sled 112 driven by the cable 115 actuates the movement of the first slide mechanism 105 as well as second slide mechanism 109.

The link rod 121 is attached on the sled 107 of the first slide mechanism 105. The link rod 121 is attached on the rear sled 122 of the second slide mechanism 109. The link rod 121 replaces a driving cable on the sled 122 of the second slide mechanism 109.

For latching the first slide mechanism 105 and the second slide mechanism 109 the second sled 112 of the first slide mechanism 105 pushes down the rod 106 which frees the tilt lever 108. Then the tilt lever 108 is coupled with the sled 107 of the first slide mechanism 105 by the holding element 111 to move further. During the closing phase, the second sled 112 presses down the rod 106 so that the tilt lever 108 is released to be connected with the rod 106 again.

The combination of the first slide mechanism 105 and the second slide mechanism 109 allows a big opening clearance for the roof opening with only one single motor.

The invention claimed is:

1. A drive mechanism for a first and a second movable panel for a vehicle, comprising: a first slide mechanism, the first slide mechanism being movable along a first direction within a guide rail for moving the first movable panel, a second slide mechanism, the second slide mechanism being movable along the first direction within the guide rail for moving the second movable panel, the first slide mechanism comprising a rod and a sled with a tilt lever, the rod being coupled with the tilt lever for pivoting the tilt lever in a first state and the rod being decoupled from the tilt lever in a second state such that the tilt lever is movable relative to the rod and relative to the guide rail along the first direction, the sled comprising a holding element, the holding element being movable between a first position and a second position, wherein in the first position the holding element is locked to the guide rail such that the sled is latched relative to the guide rail and in the second position the sled is movable relative to the guide rail to transmit a movement of the sled along the first direction to the second slide mechanism and the holding element holds the tilt lever, when the rod is decoupled from the tilt lever.

2. The drive mechanism according to claim 1, wherein the first slide mechanism comprises a second sled, the second sled being movable along the first direction within the guide rail, wherein in a third state the rod is coupled with the second sled to follow a movement of the second sled along the first direction and in a fourth state the rod is locked to the guide rail such that the second sled is movable relative to the rod.

3. The drive mechanism according claim 2, wherein the rod is moveable at least partly along a second direction transverse to the first direction to move between the third state and the fourth state of the rod.

4. The drive mechanism according to claim 1, wherein the rod is movable along a third direction transverse to the first direction relative to the tilt lever for coupling and decoupling the rod with tilt lever.

5. The drive mechanism according to claim 4, the first slide mechanism comprising a spring for exerting a force on the rod in the third direction.

6. The drive mechanism according to claim 1, the drive mechanism comprising a panel carrier for the second panel, the panel carrier comprising a pin at an end, which is facing the first slide mechanism, the second slide mechanism comprising a slider, the slider being movable along the first direction within the guide rail, the pin of the panel carrier being coupled with the slider such that the pin of the panel carrier is movable relative to the slider along the third direction transverse to the first direction.

7. The drive mechanism according to claim 1, the second slide mechanism comprising a link rod, the link rod being coupled with the sled of the first slide mechanism to transmit the movement of the sled of the first slide mechanism along the first direction to a sled of the second slide mechanism, the sled of the second slide mechanism being disposed facing away from the first slide mechanism.

8. The drive mechanism according to claim 1, wherein the holding element is pivotally connected to the sled of the first slide mechanism, and the guide rail comprises a recess, a projecting part of the holding element engaging the recess in the first position of the holding element.

9. The drive mechanism according to any of claims 1 to 8 claim 1, wherein the tilt lever comprises a slide block and the holding element comprises a notch, the slide block being arranged in the notch at least partly for holding the tilt lever.

10. The drive mechanism according claim 1, wherein the second sled of the first slide mechanism comprises a slotted guide and the holding element comprises a pin, the pin being guided in the slotted guide for moving the holding element between the first position and the second position.

11. The drive mechanism according to claim 1, wherein the second sled of the first slide mechanism is coupled to a drive cable.

12. A method for moving a first and a second movable panel for a vehicle, comprising: moving a rod of a first slide mechanism along a first direction relative to a guide rail and thereby pivoting a tilt lever for tilting a rear edge of the first panel, the tilt lever being coupled with the rod, moving the first panel relative to the tilt lever along the first direction, decoupling the rod from the tilt lever, moving the tilt lever relative to the rod along the first direction, and thereby moving a second slide mechanism for moving the first second panel.

13. The method according to claim 12, comprising: moving the rod along a second direction transverse to the first direction for coupling and decoupling the rod with the tilt lever.

14. The method according to claim 12, comprising: locking the tilt lever along the first direction relative to the guide rail during pivoting of the tilt lever, unlocking the tilt lever and moving the tilt lever along the first direction relative to the guide rail, and holding the tilt lever in its pivoted position during movement of the tilt lever along the first direction relative to the guide rail.

15. The method according to claim 12, comprising: moving a front edge of the second panel along a third direction transverse to the first direction.

* * * * *